(12) United States Patent
Krone et al.

(10) Patent No.: US 8,250,930 B2
(45) Date of Patent: Aug. 28, 2012

(54) DEVICE FOR MEASURING THE MASS FLOW OF MILK IN PARTICULAR DURING THE MILKING PROCESS

(75) Inventors: Otto Krone, Ibbenbüren (DE); Andreas Springer, Beckum (DE)

(73) Assignee: GEA Farm Technologies, GmbH, Boenen (DE)

( * ) Notice: Subject to any disclaimer, the term of this patent is extended or adjusted under 35 U.S.C. 154(b) by 984 days.

(21) Appl. No.: 11/663,415

(22) PCT Filed: Oct. 2, 2005

(86) PCT No.: PCT/EP2005/010638
§ 371 (c)(1),
(2), (4) Date: Jul. 7, 2008

(87) PCT Pub. No.: WO2006/037589
PCT Pub. Date: Apr. 13, 2006

(65) Prior Publication Data
US 2009/0025485 A1    Jan. 29, 2009

(30) Foreign Application Priority Data
Oct. 5, 2004   (DE) .......................... 10 2004 048 746

(51) Int. Cl.
*G01F 1/74* (2006.01)
(52) U.S. Cl. .................................. 73/861.04
(58) Field of Classification Search ............... 73/861.01, 73/861.08, 23.3; 119/14.17
See application file for complete search history.

(56) References Cited

U.S. PATENT DOCUMENTS

| | | | |
|---|---|---|---|
| 4,391,222 A | 7/1983 | Icking et al. | |
| 4,452,176 A * | 6/1984 | Hoefelmayr et al. | 119/14.17 |
| 5,094,112 A | 3/1992 | Hoefelmayr et al. | |
| 6,915,703 B2 * | 7/2005 | Haase et al. | 73/861.02 |
| 7,329,390 B2 * | 2/2008 | Stock et al. | 422/84 |

FOREIGN PATENT DOCUMENTS

| | | |
|---|---|---|
| DE | 37 37 607 A1 | 5/1989 |
| EP | 0 536 080 A2 | 4/1993 |
| EP | 1 396 706 A2 | 3/2004 |

OTHER PUBLICATIONS

English language Translated Description and Claims of DE 37 37 607 A1, European Patent Office's esp@cenet.com database, 3pp., May 24, 1989.

* cited by examiner

*Primary Examiner* — Jewel V Thompson
(74) *Attorney, Agent, or Firm* — Smith Law Office

(57) ABSTRACT

The device for measuring the mass flow of a foaming fluid, in particular of milk during milking, comprises a housing having an inlet and an outlet, and a measuring device for determining the mass flow. The housing is structured such that mixing the foam portion with the liquid portion of the fluid can be achieved. To this end, the inlet runs substantially tangentially into the housing interior.

33 Claims, 4 Drawing Sheets

DEVICE FOR MEASURING THE MASS FLOW OF MILK IN PARTICULAR DURING THE MILKING PROCESS

FIELD AND BACKGROUND OF THE INVENTION

The invention relates to a device for measuring the mass flow of milk in particular during the milking process. The invention is generally suitable for determining the mass flow of milk from cows, ewes, goats, buffaloes, llamas, camels, dromedaries, or of other lactating mammals and will be described below exemplary with reference to the milking of cows.

In addition the invention may be used in other areas of application where the measuring of mass flow of foamy or foam-forming liquids is concerned such as measuring the mass flow of beers, soft drinks, fruit juices, or other similar food products, as well as foaming or foamy technical fluids, such as electroplating solutions.

Information about the current milk flow is advantageous for controlling the milking process so as to modify during milking e.g. the transition from the stimulating phase to the main milking phase, or to specify the removal time, or to modify other parameters during milking. Although a high accuracy level is usually not required, it is desirable.

Milk yield measuring is also significant for drawing conclusions about the performance of the individual cows. The milk yield can be gathered by way of integrating the mass flow of milk during milking. It is useful to have accuracies meet the requirements of ICAR since this would eliminate the need of regular separate milk yield measuring. Although the requirements for an ICAR (International Committee for Animal Recording) admission depend on the animal variety and other parameters, they are generally high. The allowable error in milk yield measuring for cows, assuming a milk yield larger than 10 kg, is 2 percent maximum at a standard deviation of 2.5%. As a rule, however, a general assessment of performance or controlling the milking process does not require this level of accuracy for determining the current mass flow.

One advantage of measuring the mass flow of milk is that in individual cases, the shape of the milk curve during milking or the total milk yield will allow to draw conclusions on the state of health of the animal.

One problem encountered in milk flow measuring is that milk is a heavily foaming fluid. Foam formation during milking is further intensified by the currently employed milking techniques since as a rule air is periodically or continually allowed to enter into the milk collection piece and/or the teat cups during milking to discharge the milk. Although the volume of air intake per unit time may vary, it will as a rule be approximately 8 liters of air/minute or even higher. Assuming a maximum milk flow e.g. for cows of approximately 10 or 12 liters of milk per minute in the main milking phase, the air volume to be discharged will roughly be at least approximately 25%, in particular at least 40% or even 50% of the volume flow of milk yield and air intake. And this quite considerable portion is already present during the maximum milk flow phase. Near the end of milking the proportion of air to be discharged will rise even higher due to the decreasing milk flow. Added to this there is the proportion of air entering at the teat cup due to less than tight sealing between the liner and the teat. This proportion can also be roughly estimated at e.g. 10 liters of air per minute. The considerable proportion of air in the air-fluid mixtures to be discharged may thus cause substantial formation of foam which considerably impairs milk flow measurements in flow.

Since the proportion of foam does not readily permit conclusions on mass from the volume, the accuracy of milk yield measuring methods through volumetric methods has its limits. Both the proportion of air in the fluid and the bubble size in the foam are not always even but they depend on a plurality of factors. These factors include, the milk temperature, the milk flow rate, the position and layout of the milk hoses, the type of milking unit, the type of teat liner, the milk hose diameter, the type of milking installation, the vacuum level and the pulse rate during milking, air leakages or air infiltration, the current state of health of the udder, individual differences between cows e.g. due to the lactation stage or the race of the cow, and due to differences in kind and quantity of feeding, etc.

Another problem in measuring the milk yield flow is caused by the periodic milk flow. Unlike measuring volumetric flow in many other applications, milk is drawn periodically. The teat space in the teat cup is subjected to a periodic vacuum such that milk will flow out of the teat approximately at the pulsation rate. The pulse rate typically lies between approximately 30 and 90 at e.g. 60 cycles per minute. Given four teats and identical rates with all of the teats, there will be a milk flow having approximately 60 milk flow pulses per minute. Where the udder halves or the four teats e.g. of a cow are selected variably, the high frequency proportion of the milk flow may increase to reach approximately 240 strokes per minute at a pulse rate of 60. Milk is often conveyed through the milk hoses in clusters such that short phases at maximum milk flow alternate with short phases at minimum milk flow. Determining the actual milk flow is difficult under these conditions.

Due to these influences, measuring the milk flow or the mass flow of milk is found to be difficult since the nature and composition of the foam phase on the one hand and on the other hand also the composition and quality of the liquid phase within one milking process and between milking processes are subject to fluctuations. For example the electrical conductivity of the fluid and the proportion of the foam phase may vary continually since e.g. the fat content may change during milking which will cause fluctuations in terms of electrical conductivity and the optical properties of the milk. Measuring methods based on measuring these parameters may thus be subjected to considerable inaccuracies.

Instead of measuring mass flow through volumetry, measuring methods and measuring devices have thus become known which take the fluid density into account. To this end, the electrical, optical, or e.g. acoustic impedance in flow can be measured.

EP 0 536 080 A2 discloses milk flow measuring in flow wherein the milk is guided through flow channels, and transmission of an infrared light beam through the milk is measured and analyzed. The temporarily dampened or dimmed infrared light beam through the channel as milk is flowing through allows to draw conclusions on the momentary mass flow of milk through said channel. One drawback of optical measuring is for example that small and large foam bubbles can scatter the light beam employed for measuring such that in the presence of foam not enough light can be measured in transmission or reflection measuring so as to result in measuring errors.

DE 37 37 607 A1 discloses another method and a device for milk flow measuring in flow. A plurality of electrodes positioned one above the other is provided to firstly determine the electrical impedance or electrical conductivity of the liquid-air mixture on the respective levels by means of the electrodes. In the bottom region, a reference conductance of the liquid currently passing is measured. On the basis of each height value the stepped level profile of the specific impedance is calculated by means of the reference conductance. The flow velocity of the draining off liquid is known for known impedance profiles from calibration measuring such that the stepped level profile permits conclusions on the flowing mass of the milk. Due to the principle applied, this known device is very complicated in terms of mechanics and electronics.

Another basic problem in measuring the mass flow of a foaming fluid by way of such a density profile or a fill height is that foam bubbles may accumulate and remain stuck in the measuring area without the foamy portion draining off. Such stationary foam may result in measuring errors.

For example when stationary foam is present in the measuring area and then the electrical impedance between two electrodes is measured or the optical impedance between transmitter and receiver or the acoustic dampening or the like, to determine the fill height or the level profile of density in front of a diaphragm, the stationary foam portion will be included in each measuring. A thus measured fill height is higher than the fill height of the actually flowing fluid. Referring back to the calibration parameter with this fill height will thus provide a faulty mass flow. In this example the mass flow value measured is higher than the actually flowing mass since the actually measured value is higher by the accumulated and in this example stationary foam portion.

Another measuring error results from foam accumulating in a quantity such that the stationary foam is pressing on the flowing fluid, thus increasing the flow velocity. Consequently the assumed flow velocity no longer corresponds to the calibrated flow velocity, and measuring the mass flow will be faulty. Such faults may occur in particular where a large proportion of the clear flow cross-section is filled with foam.

It has been known in the prior art to prevent measuring inaccuracies caused by stationary foam pressing against the measured fluid by positioning an expansion chamber in front of the measuring area to receive large amounts of foam. However, this method cannot prevent the weight of the stationary foam from accelerating the flowing fluid. Moreover, devices thus equipped are relatively large in structure. Also, even a large expansion chamber can entirely fill up with foam. Then, cleaning the foam expansion chamber may prove difficult.

For the given reasons it should be reliably prevented at least during a large part of the main milking phase that the foam portion accumulate in the measuring area and that stationary foam press on the liquid phase, so as to obtain sufficiently accurate measuring results.

SUMMARY OF THE INVENTION

It is therefore the object of the present invention to provide a device for determining the mass flow in particular of a foaming liquid, so as to prevent such adverse effects with simple means at least during the main milking phase.

The device according to the invention is suitable for measuring the mass flow in particular of a foaming liquid. The device according to the invention is in particular suitable for measuring the mass flow of milk, in particular during the milking process. The device comprises a housing having at least one inlet and at least one outlet. At least one measuring device having at least one sensor is provided to determine the mass flow. Said housing is structured such that mixing the foam portion with the liquid portion of the fluid can be achieved. To this end, the inlet leads substantially tangentially into the housing interior. Furthermore, an axis of a housing section in front of the sensor is vertically inclined at least 30° and the interior housing section in front of the sensor is at least substantially configured to be rotationally symmetric. The interior section is in particular substantially rotationally symmetric relative to the axis.

The invention is suitable for continuous measuring and is in particular provided for measuring in flow.

By means of mixing the foam portion with the liquid portion of the fluid, large accumulation of foam phase during the main milking phase is reliably prevented. The foam is being mixed in such that substantially no stationary foam is present which might press down on the liquid surface. Mixing in the foam is considerably assisted by the housing in front of the sensor, whose interior section is structured to be at least substantially rotationally symmetric.

This configuration for mixing in the foam has quite considerable advantages. For one, due to the rotationally symmetric or substantially rotationally symmetric interior structure, only the existing foam is mixed in but no new foam forms. For another this design is gentle on the milk since the forming of free fatty acids is not supported. Contrary to this, when milk is allowed to bounce e.g. onto a surface, the milk quality may be impaired and foam may also form.

Another significant advantage of the device according to the invention is the facility and reliability of cleaning since washing liquid is tangentially introduced through the inlet and reliably wets the inner surface of the measuring device. The device according to the invention is furthermore easy to disinfect and maintain since it does not require any moving members. The measuring housing may be very simple in structure and small in dimensions.

Another advantage is the possibility which the device according to the invention offers, of in-flow measuring the intermittent milk yield with high precision during milking. The pulsating milk flow is highly demanding in respect of the structure of the device which in the present case are fulfilled to a high degree.

A preferred embodiment provides for the housing being structured so as to achieve a helical fluid stream. A rotating and helical fluid motion path at the inlet achieves an excellent mixing in of the foam portion in that the spin generated in the inlet region will entrain and discharge foam. Already present or newly forming foam is mixed into the liquid phase. The cleaning effect is also excellent.

Thus this specific embodiment does not comprise the disadvantages of the prior art described above since the foam is discharged. The device permits easy and reliable operation.

The housing is preferably structured such that at least the inlet region of the housing interior is substantially rounded.

The housing is advantageously structured such that at least the inlet region of the housing interior is horizontally inclined. Inclined in the sense of the present invention is understood to mean that both a horizontal angle and a vertical angle are present. Preferably said angles are in the range of 45°. The inclined design causes foam portions to be mixed into the fluid.

Such a configuration of a device for measuring the mass flow of a foaming liquid, in particular of milk is advantageous, comprising a housing and a measuring section positioned therein, where at least one inlet and at least one outlet and a measuring device for determining the mass flow are provided. Said inlet leads substantially tangentially into the housing interior and at least in the inlet region the housing interior is substantially rounded. At least in the inlet region the housing is horizontally inclined in this embodiment such that a mixing of the foam portion with the liquid portion of the liquid can be achieved.

In preferred specific embodiments of all the configurations described above the housing may comprise at least two sections, e.g. a first and a second section, with these two sections positioned at an angle to one another. This angle may be up to approximately 90°, preferably it is between approximately 10° and 60°. An advantageous angle is e.g. in the range of approximately 45°.

Preferably at least the inlet region is horizontally inclined. Advantageously an angle of inclination in the inlet region is between 10° and 60°. Advantageous embodiments may provide an angle of inclination of 45°.

Preferred embodiments provide a center section of the housing between inlet and outlet at an angle to the horizontal so as to achieve self-discharging. The angle may be e.g. 2° to 45°. In particular said angle is between 2° and 30° and preferably between approximately 2° and approximately 15°.

Preferably at least one housing section is substantially round or oval in cross-section. In particular the inlet region is preferably round in cross-section to guarantee a reliable mixing in of the foam portion.

Preferably the inner cross-section is an oval or rounded over a substantial portion of the measuring section and in particular it is substantially round in shape. The outlet region may also be formed like this. The outer cross-section may also be configured correspondingly. Overall the housing may consist of one or more tubular sections.

It is also conceivable that the entire housing is substantially tubular in structure where no two sections are positioned at an angle to one another. In this case it is preferred to configure the device such that the device or the housing are horizontally angled when properly installed. Then the measuring section is inclined 2.5° to 30°, preferably between approximately 5° and 15°. This configuration permits ease of manufacture, cleaning and maintenance of the housing or the device.

The inlet may comprise an inlet nozzle. Preferred embodiments may provide for an inclined inlet into the housing. The inlet may in particular be positioned inclined relative to the longitudinal axis of the housing and not perpendicular to the direction of flow but at an angle in the range of 30° to 90° to the longitudinal axis of the housing in the inlet region. An angle of e.g. 45°+/−15° is in particular conceivable. An inclined inlet nozzle will achieve a particularly effective helical fluid motion in the inlet region when the housing is also inclined since inlet occurs at an angle to the longitudinal axis of the housing.

It is also preferred to introduce the fluid tangentially at least on one level. The fluid is particularly preferably introduced such that it will flow on a tangent relative to the inner cross-section of the housing. An advantageous design and configuration of the inlet is one where the fluid to be examined moves helically along the measuring section.

In preferred specific embodiments the measuring device comprises at least one means selected from a group of means comprising, an optical means, an electrical means, an acoustic means and/or a magnetic means. It is also possible to provide two or more and also different means.

Preferably at least one measuring device comprises at least one electrical means which comprises a first and at least one second electrode, an electrical means, and an analysis means.

The first electrode in particular is spatially considerably extended and it is in particular elongated in shape. The first electrode considerably extends in particular perpendicular to the direction of flow.

The second electrode preferably also extends spatially and it is in particular elongated in shape where it may be configured as a spot electrode or a contact electrode to the fluid to be measured.

Said first and said second electrode are preferably positioned in the region of the measuring section, extending at least over part of the height of the measuring section.

Preferably an electrical magnitude and preferably a voltage can be applied to the first electrode by means of the electrical means. The electrical means is thus substantially connected in parallel to the first electrode. The electrical means is connected in particular with two spaced-apart spots on the first electrode such that it is connected in parallel to the first electrode. The two spaced-apart spots on the first electrode may be positioned in particular at two ends, in particular at the two ends of the first electrode.

Preferably the second electrode is electrically connected with the first electrode through the analysis means. The analysis means is preferably electrically mounted between the first and the second electrode. The analysis means is in particular electrically connected with the first electrode on one side, and on the other side electrically connected with the second electrode.

In measuring, the electrical means captures the height of the flowing fluid not in steps but continuously. This permits to achieve a high measuring accuracy. According to the invention it is not the fill height that is measured but an integral density profile. Due to the principle applied, individual calibration for each cow is not required.

The mass flow is derived from the density profile. The calibration parameters used are preferably those including the influences specific to the devices. For example one can take into account which flow velocity will ensue from which density profile.

The electrical means preferably operates with a potential measurement by performing potentiometric measuring. To one electrode, e.g. the first electrode, a potential is applied which drops nearly linearly along the electrode, at least when cross-section and properties of the material along the electrode remain constant.

In measuring, the first electrode is wetted with the foaming liquid up to a specific height. Wetting occurs both with the liquid phase and a possibly present foam phase. Therefore, a potential curve is introduced into the fluid depending on the height and the quality of wetting.

Now, the second electrode is positioned spaced apart from the first electrode. The foaming liquid between the two electrodes overall forms an impedance. The level of impedance is integrally formed by the fluid between the electrodes. The higher the proportion of liquid, the smaller the impedance, and the larger the foam proportion present in the volume between the two electrodes, the larger the impedance. The impedance is also related to the horizontal distance.

Preferably the housing or the measuring section is relatively short from the inlet or inlet nozzle to the measuring level compared to a height dimension of the measuring section or the channel. Preferably the length of the housing is no larger than five times the height dimension, particularly preferably the length of the housing is equal to, or up to three times the height dimension. This configuration is most advantageous since with a too long measuring section the flow can quieten too much such that the positive effect of the spin may be lost. Then it might happen that part of the foam accumulates above the fluid to be measured and being stationary, foam will cause measuring errors. Surprisingly it has been found that a relatively short housing or a relatively short measuring section is very positive. This also results in the desired small housing.

Preferably at least one flow restriction is provided in the housing. Preferably said flow restriction is positioned at the measuring section. The flow restriction is in particular configured as a diaphragm or comprises at least one diaphragm.

The diaphragm in the sense of the present application is a resistance to fluid flow preferably formed through a narrowing of the clear flow cross-section of the measuring section wherein said clear flow cross-section is preferably configured as a channel.

The flow restriction is provided to dam the flowing fluid. Preferably the measuring device or the electrodes is/are provided in the vicinity of the flow restriction.

A diaphragm is already known from a device according to DE 37 37 607 A1. Unlike said device, the diaphragm or the discharge slot according to the invention can be made considerably wider, in particular where the resolution of the measurement is not related to the fill height. The known device having a plurality of electrodes positioned one above the other provides for a stepped resolution such that a high measuring resolution can only be achieved above a fill height corresponding to a multiple of the step spacing. The resolution is preferably independent of the slot width such that a wide slot can be provided.

This will also considerably reduce the risk of the discharge slot stopping up. Damming of the fluid in front of the discharge slot in conjunction with the discharge stopping up will show a higher flow rate than actually exists. This is why the known device according to DE 37 37 607 A1 provides for sieves in the inlet region which require regular cleaning This considerably complicates permanent use of such a device firmly mounted to a milking appliance since a lot of additional maintenance and cleaning is required.

This drawback is avoided in a specific embodiment of the device according to the invention where the measuring resolution is not restricted by being stepped. The principle of capturing stepless measured values allows to obtain high accuracy. The outlet cross-section can be configured larger and the discharge slot wider than in the device known from the prior art. This has the considerable advantage that any foreign matter or foreign particles in the milk are drained off, not stopping up the flow path. Such foreign particles may be e.g. straw, bedding spread or feeding remnants such as e.g. corn seeds.

Feeding remnants or other foreign bodies such as straws can e.g. be sucked off the floor before the vacuum is turned off when a teat cup falls off or is kicked off. Inadequate teat cleaning also may let foreign bodies get into the milk such that the discharge slot may get stopped up, in particular if it is too small e.g. for corn seeds to pass through. Upstream filters are not necessary for the device according to the invention.

Preferably the flow resistance is adjustable e.g. by way of the flow cross-section of the flow restriction. Particularly preferably the diaphragm is exchangeable or adjustable. This allows to adjust the magnitude of hydrodynamic resistance.

The advantage of this is that even in measuring clearly smaller maximum milk flows (e.g. when milking the udder quarters separately or for animals whose maximum milk flow is generally low such as ewes or goats) the achievable measuring accuracy and measuring resolution is as high since the entire measuring area height will be used. Where the available measuring area of the device is optimally utilized, a particularly high measuring accuracy is obtained.

Preferred specific embodiments comprise at least one flow restriction having a cross-section that is variable in height. Preferably the cross-section of the flow restriction or the diaphragm increases with the height above the bottom. Preferably the cross-section increases continuously with the height above the bottom.

Preferably a clear distance in the narrowest region of the flow restriction is larger than 2 mm, preferably larger than approximately 5 mm and particularly preferably larger than the diameter of a typical corn seed. A smallest clear distance of e.g. 7 mm is advantageous for a diaphragm since most of foreign bodies which may get into the milk despite all precautions are smaller or at least smaller in dimension.

It is particularly preferred to have the diaphragm positioned inclined, traverse to the direction of flow.

It is particularly preferred to have the diaphragm positioned to incline upwardly in the direction of flow. With the flow toward the right in the direction of the arrow "→", the diaphragm runs from the bottom left to the top right "/" and vice versa ("\←"). The diaphragm thus serves to flush off foreign bodies such as corn seeds etc.

Preferred specific embodiments provide for the cross-section of the flow restriction to be configured substantially trapezoidal and/or V-shaped and/or U-shaped. This means that in a bottom region the diaphragm has a clear distance d1 and above that, a clear distance d2, with d2 being larger than d1.

Specific embodiments may have the flow restriction configured such that a cross-section of the measuring section tapers to decrease in the direction of flow. Therein a first cross-section perpendicular to the direction of flow is larger in a first position than a downstream, second flow cross-section. Preferably a flow cross-section is provided that is tapering to decrease in the direction of flow, e.g. cone-shaped or conical, frusto-conical or the like.

It is preferred to have the inlet region near the flow restriction configured substantially trapezoidal and/or V-shaped and/or U-shaped in a top view. This means the cross-section in the horizontal, not in the vertical direction, thus a cross-section parallel to the bottom of the measuring section.

A specific embodiment provides a shape tapering downwardly, perpendicularly to the direction of flow and a shape tapering to decrease in the direction of flow.

Preferred embodiments of the invention provide in the housing a channel extending at least partially in the region of the measuring section.

A preferred embodiment of the invention provides at least one electrode configured as a device extending into the channel. It is also conceivable to incorporate one electrode or two or more electrodes into the channel walls. In this way, easy cleaning and maintenance will be achieved and high reliability of the measuring device.

Preferred embodiments provide at least one electrode formed by, or integrally with, one housing element. For example, one electrode or both of the electrodes may be provided in the wall or on the wall of the channel. Also, at least one electrode may be positioned at the flow restriction or at the diaphragm.

In the case of a diaphragm used as flow restriction, one electrode each may be provided on opposite sides. Then it is preferred to predefine or at least influence the width of the diaphragm aperture by the two electrodes. Preferably both of the electrodes are provided at the diaphragm.

It is a considerable advantage to have the flow resistance formed by the electrodes at least in part. Then the electrodes and the diaphragm will form one integral component. For example one electrode is incorporated into the surface of the flow resistance. This measure will achieve a still further simplified structure.

In all of the cases it is preferred to have at least one electrode positioned upstream of the diaphragm or of the flow resistance.

One electrode may expediently be placed in a region dammed by the diaphragm, preferably very close to the flow resistance so as to achieve the most precise determination of the mass flow possible. The second electrode may be positioned somewhat upstream of the diaphragm, or else it may be physically connected with the flow resistance.

In other configurations no cross-section restriction is provided at least in the region of the electrodes. The measuring area in which the electrodes are positioned will then be formed preferably e.g. as a polygon channel. The preferred cross-section is in particular round or else oval in shape. Then with the electrodes incorporated in the channel walls, the mass flow of the flowing fluid is determined without requiring a cross-section restriction. Such a configuration offers advantages in particular in respect of foam discharge.

Preferred embodiments of all of the configurations described above may provide a recess e.g. in the shape of a hollow in the bottom area of the measuring section.

The structure and the flow guidance are preferably provided such that the liquid phase of the fluid or of the foaming liquid to be measured will always be naturally present in said hollow. Continuous calibration relative to the liquid phase may then be performed in the hollow. Then, when in the measuring area above the hollow only foam phase is present, the value captured by the measuring device may include the momentary properties of the liquid phase.

The hollow ensures that even with lowest milk flows, liquid phase will be present therein so as to continuously be able to determine the current properties of pure liquid phase to thus enhance accuracy. Calibration may occur for electrical, chemical, optical, or acoustical properties. In this way it is assured that pure foam will not be considered as a pure liquid phase.

The depth of the hollow or recess is much smaller than the height of the channel. The ratio may be larger than 1:5 and lies in particular in the range between approximately 1:10 and approximately 1:30, at approximately 1:20.

Preferably the hollow comprises a drain in one specific embodiment. With the drain being constantly open during measuring there will be continuous exchange with the measured fluid such that the hollow will always contain representative fluid. Otherwise, depending on the configuration of the hollow and the properties of the measured fluid there may only be minor fluid exchange during measuring which may cause measuring errors.

A recess without drain is also conceivable. Then, exchange occurs e.g. by way of the fluid in the recess being entrained.

If a drain is provided it may be closable. The drain may for example be closed during measuring, in particular where fluid exchange is sufficient. For cleaning the device, the drain may then be opened to allow for easy cleaning of the hollow.

The drain may for example be formed of a small discharge channel connecting the hollow with the discharge. Or else, the drain of the hollow may be connected with a separate outlet or coupling.

One significant advantage of a drain is that the recess empties itself at the end of milking such that after rinsing, no residual rinsing water can enter the milk of the following cow.

The flow velocity between inlet and outlet of the device may depend on the current pressure. This is because when, with equal density distribution above the height in a first example, the pressure differences above the measuring section are higher than in a second example, the milk will flow faster in the first example than in the second. For example if additional air enters a teat liner, the milk flow rate will accelerate due to the air intake. Moreover, pressure may build up locally above the measuring section, increasing the flow velocity. Since as a rule, velocity will not be metered separately but calibration measurements are employed, the mass flow determined by way of the calibration curve will no longer match the current mass flow. When calculating the mass flow without separately measuring the velocity, only the velocity from calibration is utilized such that the mass flow calculated will be too low and a measuring error would be generated.

However, constructive measures may reduce or avoid this influence. To stabilize the pressure ratios and to avoid effects from changing pressure ratios acting on the flow velocity and thus on the measuring accuracy, it is therefore advantageous to provide for pressure compensation above the device.

A device for passive or else active pressure compensation above the measuring device will achieve that the flow velocity is substantially determined by gravity. Such a device for pressure compensation will achieve that in the entire measuring area the flow velocity will substantially correspond to simple calibration.

By way of the bypass, any flow accelerating effects of air infiltration e.g. at the milking unit will be substantially reduced and the measuring accuracy enhanced in these situations.

Other configurations may provide that where the effect of a pressure difference is known, measuring said pressure difference above the measuring section can be sufficient so as to calculate the mass of the momentary flow from the height profile of the density and the pressure difference.

Preferably, however, a pressure compensation in the shape of a passive bypass between inlet and outlet is employed to stabilize the pressure above the measuring section.

Preferably said bypass is positioned and mounted such that substantially only gaseous phase, meaning air, but no foam or liquid phase is discharged through the bypass. Bypasses are in particular suitable to avoid back pressure. The bypass is particularly preferably provided in the vicinity of the inlet or intake, in particular in front of the measuring device or the electrodes.

Due to the bypass, the device for measuring a mass flow does not represent a substantial flow resistance. The additional pressure supply ensures that the pressure near the inlet is approximately the same as in the milk pipeline in front of or after the device for measuring the mass flow. In this way no pressure gradient will occur within the device which might affect the flow velocity of the fluid.

Preferably the bypass comprises a bypass coupling to keep the device pressureless. The bypass coupling may be configured e.g. as a bypass nozzle. Preferably the bypass nozzle is provided in a region in the vicinity of the inlet.

Preferably the bypass coupling further serves to directly discharge a large proportion of the milkless air stream. Discharging a large proportion of the air causes a reduction in foam formation along the measuring section. Discharge of air furthermore prevents adverse effects on the flow velocity. The bypass coupling and the inlet together may serve as a cyclone collector, thus establishing a fluid connection with the device outlet.

A particularly preferred configuration provides a measuring device comprising a tubular housing into which the milk flows in a tangent line so as to form a cross flow relative to the conveying direction. This offers the advantage that for one, the milk flows in gently with little spin and for another, the rotation of the fluid will cause the flow energy to decrease so as to ensure a more constant flow velocity at the measuring device. The bypass nozzle separates the milk somewhat from the air since the milk, being heavier, is urged against the wall of the cyclone collector housing due to the tangential inlet and a portion of the lighter air remains in the center of the cyclone collector from where it can be siphoned off through an air removal nozzle provided therein. A cyclone collector equipped with a bypass will in particular ensure that approximately the same pressure will occur at the inlet as in the milk pipeline and at the outlet.

A preferred specific embodiment of the invention provides at least three electrodes. Said three electrodes may be employed for determining the angle of inclination. To determine the angle of inclination the device is partially filled in particular with a fluid and preferably closed so as to prevent the fluid from draining off. Said fluid may be water or another suitable liquid. An electrical magnitude is applied for example to the first electrode. A first measurement value is sensed between the first and the second electrode and a second measurement value is sensed between the first and the third electrode. Now when the second and the third electrode are spaced apart in the direction of flow, an angle of inclination of the device can be determined based on the first and the third measurement value. It is also possible to determine a three-dimensional inclination e.g. with four electrodes suitably positioned.

After determining the angle or angles of inclination this value may be employed for corrections to calibration. It is also conceivable to refer back to a suitable calibration curve stored in the device memory by means of the determined angular value. The overall reliability and accuracy can thus be enhanced still further.

In another configuration the inclination is measured employing only the two basically provided electrodes. To measure inclination, the device is emptied out and the drain is closed and filled with a predefined quantity of fluid. Before measuring the inclination, measurement values were taken at different angles of inclination and a table of parameters established to be employed as a calibration curve for inclination measurements. This procedure allows to directly derive a measure for the angle of inclination from the basically provided electrodes since the fill height of the fluid at the electrodes is a direct measure of the angle of inclination. A third electrode is not required.

The incorporated inclination sensor described above which uses two, three or more electrodes, offers significant advantages. The additional process steps are minor since only one additional electrode is required. The analysis means is required only once and may be employed for analyzing the volumetric measurement and for determining the inclination, thus allowing a cost-effective realization.

Preferred embodiments of all of the specific embodiments described above may provide a separate inclination sensor. An inclination sensor as known from the prior art is for example suitable. The signal or signals of the inclination sensor are used for selecting a suitable calibration curve from a number of calibration curves, or to select a fixed or flexible correction parameter and/or correction factor for the measurement values.

An incorporated separate inclination sensor offers the advantage that the alignment of the device can be checked at fixed or irregular intervals. Said checking may be performed once in a period such as once a year, a month, week, or day, or preferably at least once per measuring process. The position may be determined during measuring in that as each measurement value or every nth measurement value is captured the signals from the inclination sensor are taken into account.

A particularly preferred embodiment provides a measuring chamber for the inclination sensor mounted at the device. The inclination sensor may operate according to the measuring principle described above. Then the measuring chamber for the inclination sensor comprises three and preferably at least four electrodes. The electrode layout is provided such that an inclination angle can be determined at least in the direction of flow of the fluid to be measured. It is conceivable to provide for the measuring device for determining the quantity or the mass flow of the fluid and for the inclination sensor one common analysis means.

In preferred embodiments of all of the configurations, a partition wall is provided between a first and a second housing section which closes off in particular a considerable portion of the clear cross-section area. Preferably the partition wall closes off at least 50% of the area, in particular at least 75% of the area. Preferably the partition wall closes the upper portion of the cross-section area such that the fluid must flow beneath the partition wall. This supports mixing in of the foam.

Further advantages, features and configurations of the invention will now be described in the following embodiments with reference to the figures. These show schematically in:

DETAILED DESCRIPTION OF THE PREFERRED EMBODIMENTS

Figure 1:
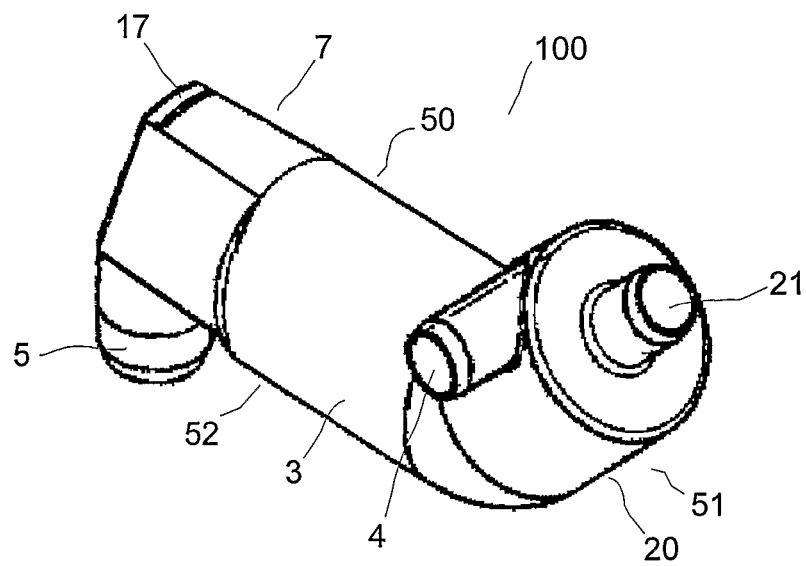
FIG. 1 a device according to the invention for measuring a mass flow in a three-dimensional, perspective view with a diaphragm inserted.
Figure 2:
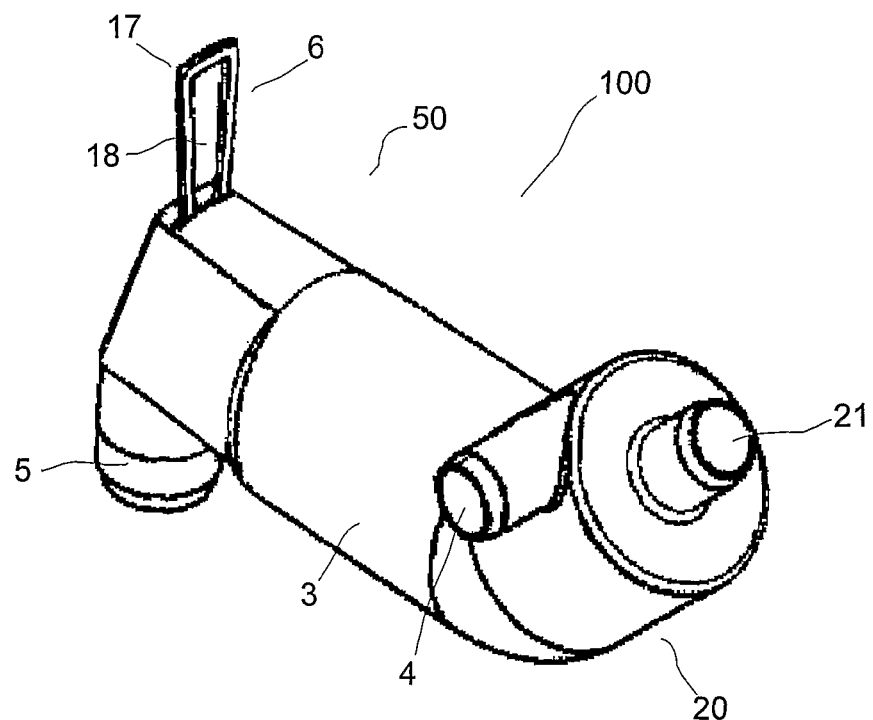
FIG. 2 the device according to FIG. 1 with the diaphragm pulled out.

The FIGS. 1 and 2 show a first embodiment of a device 100 according to the invention in a perspective view for measuring a mass flow of a fluid 1, in particular a foam containing or foamy liquid or a foaming liquid such as milk. In the vicinity of the inlet 4 of the housing 50 a pressure compensation nozzle 21 is provided to remove air. The inlet 4 leads tangentially into the housing 50 such that the fluid rotates while running into the housing. Furthermore a channel 3 is provided subsequent to the inlet 4.

A measuring system 7 is positioned in the channel 3 in front of a diaphragm 17 in this embodiment with said diaphragm 17 being positioned upstream in front of a drain 5. The diaphragm 17 serves as a flow resistance 6 (see FIG. 2). Preferred embodiments provide that the diaphragm can be inserted (see FIG. 1) or exchanged (see FIG. 2) as needed. Exchanging the diaphragm 17 allows to adjust the flow resistance to different conditions since e.g. in milking ewes or goats the maximum milk flow is considerably smaller than in milking cows.

The diaphragm 17 has a trapezoidal opening cross-section 18 which increases upwardly. The diaphragm 17 predetermines the magnitude of hydrodynamic resistance of the flow resistance 6. The flow resistance is adjustable by changing for example the clear opening cross-section and its conicity. The air removal device or bypass nozzle 21 serves to maintain the entire measuring device substantially pressureless by removing a portion of the air contained in the fluid whose mass flow is to be determined.

Figure 3:
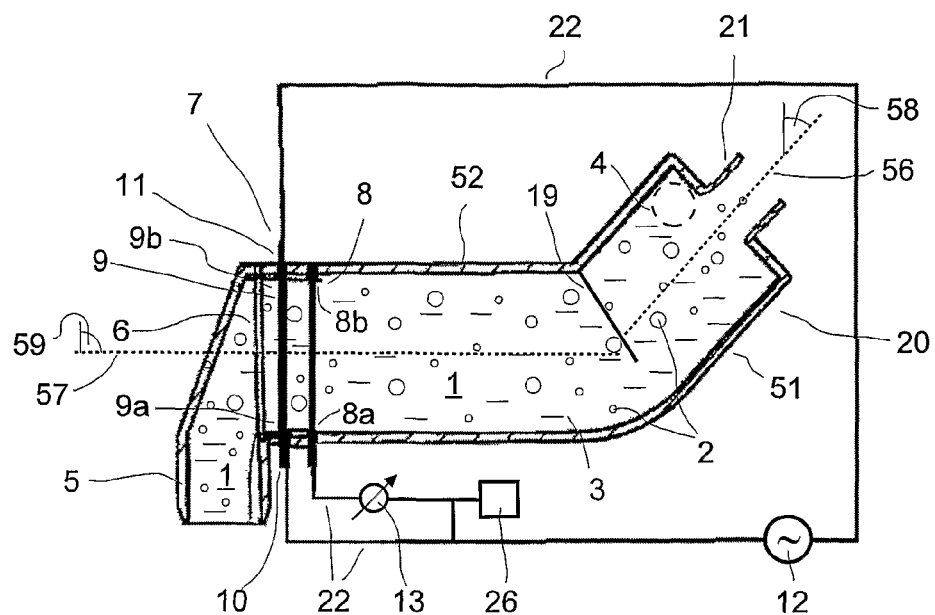
FIG. 3 a device according to the invention as in FIG. 1 in a longitudinal section.

FIG. 3 shows a device 100 according to the invention for measuring a mass flow in longitudinal section with the channel 3 which comprises an inlet 4 (see FIG. 1) and an outlet 5 and through which a fluid 1 flows which contains a foam portion 2. The inlet 4 is incorporated in a cyclone collector 20 through which gas or air can be partially removed via the bypass nozzle 21 or the air removal device 21.

The fluid flows into the housing 50 in the inlet region in a tangent line. The fluid flow lays against the housing element 51 which is round in shape and which serves as a cyclone collector 20. The heavier liquid phase is urged outwardly while at least a portion of the gaseous phase 2 accumulates in a central area and is discharged via the bypass nozzle 21. The bypass nozzle is positioned centrally at the end of the housing element 51 which is cylindrical in shape there, connecting the first element of the housing 50 at which the inlet 4 is provided via a bypass line with the second end of the housing 50 where the outlet 5 is provided so as to establish a pressure balance between inlet 4 and outlet 5. This serves to maintain the measuring device 100 per se pressureless such that the established flow velocity of the fluid is substantially not based on pressure differences. Increased pressure differences might otherwise be caused e.g. by air infiltration at the teat liner. Overall, a bypass permits an increase in reproducibility.

The housing 50 comprises a first element 51 and a second element 52. The first element of the housing 51 is inclined to the horizontal in the region of the inlet 4. In this embodiment the angle is approx. 45° to the horizontal. The second housing element 52 is also inclined to the horizontal so as to support the flowing movement. The angle of inclination is smaller though and related to the actual conditions. As a rule the angle will be smaller than 30°, preferably smaller than 15°. Good results have been achieved with an angle of inclination of 5°.

A center axis 56 (the dashed line) through the first housing element 51 or the first section of the housing 50 is inclined relative to the vertical orientation by an angle 58 which in this embodiment is approximately 45°. A center axis 58 (the dashed line) through the second housing element 52 or the second section of the housing 50 is inclined relative to the vertical orientation by an angle 59. Both housing elements are configured to be virtually rotationally symmetrical relative to their center axes 56 and 57. In particular the round cross-section of the second section 52 in front of the sensor with the first and the second electrode serves to cause the foam to be mixed into the flowing fluid in the relevant measuring area such that any present or forming foam will be flushed off and cannot accumulate.

In particular the inclination of the first housing element 51 causes the fluid to flow through the housing 50 in a helical pattern. The fluid flowing in is guided radially and due to gravity an additional, axial factor is introduced.

In this embodiment the housing 50 includes an overflow or a partition wall 19 which is provided herein between the first housing element 51 and the second housing element 52 and extends from the roof rearwardly and downwardly at an incline. The partition 19 closes off the device in the upper region such that fluid can only pass beneath from the first housing element 51 to the second housing element 52. The partition 19 serves to additionally decelerate the flow velocity and to better mix the foam in since the foam floating on the liquid can only pass the clear cross-section beneath the overflow when it is mixed in, since the clear cross-section tends to be beneath the liquid level. Other embodiments may be provided without a partition 19.

Generally, the helical fluid movement continues through the entire housing 50 so as to provide a helical fluid movement also in the second, substantially cylindrically configured housing element 52, at least with strong fluid flows.

It is a substantial advantage of this structure that the foam portion of the fluid is entrained and mixed in. In conventional housing structures and flow conditions, foam tends to rise and to accumulate above the flowing liquid portion of the fluid as a stationary foam portion. The present configuration largely avoids this. The foam portion is reliably discharged at least in the milk flows occurring during the main milking phase. At the beginning and ending of milking the foam portion is as a rule also reliably discharged. Since the principle of the measuring method employed includes the foam portion, the measuring accuracy achieved is excellent as a whole.

The fluid 1 is dammed in front of the drain 5 in the second housing element 52 by way of a flow resistance 6 provided in the shape of a diaphragm in this case, emptying into the drain 5.

Figure 5:
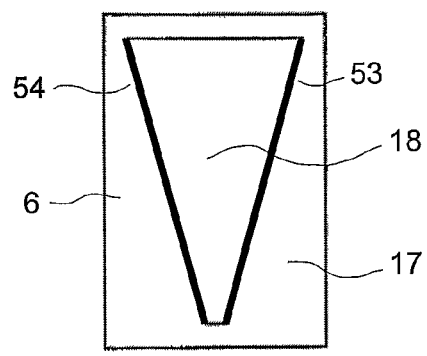
FIG. 5a flow resistance for large mass flows configured as a diaphragm.

The measuring device 7 is formed by the two electrodes 8, 9 and the voltmeter means 13 and the voltage source 12 or the voltage generator means. The electrodes of the measuring device 7 may be placed in the vicinity of the flow resistance 6. The diaphragm may in particular be formed by the electrodes as illustrated in FIG. 5 such that a first sidewardly boundary 53 of the diaphragm may serve as the first electrode 9 and the second sidewardly boundary 54, as the second electrode 8.

Figure 4A:
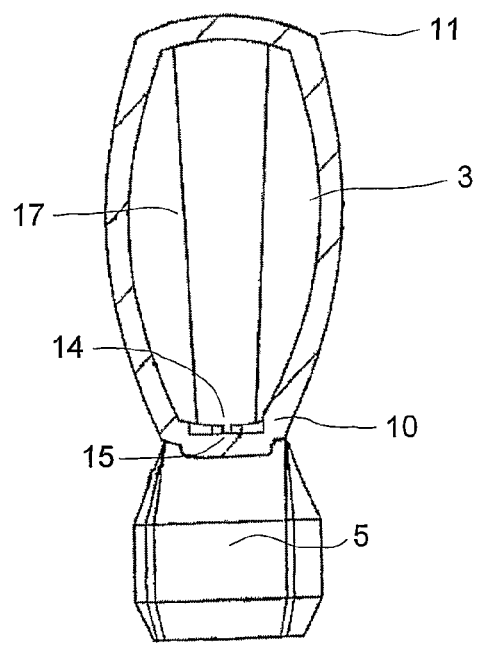
FIG. 4A a device according to the invention as in FIG. 1 in a cross section in the region of the measuring device.
Figure 4B:
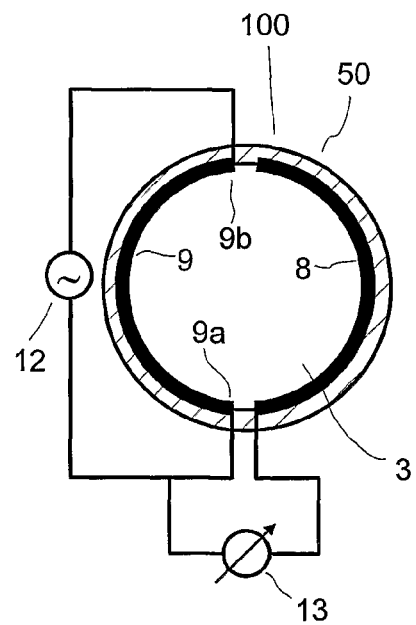
FIG. 4B a second embodiment of a device according to the invention in a cross section in the region of the measuring device.

Although the first electrode 9 in FIG. 3 is configured as a round bar of a conductive material (e.g. high-grade steel), it may be incorporated into a wall of the channel 3 as illustrated in FIG. 4B.

The voltage generator means 12 serves to predetermine an alternating voltage so as to avoid electrolytic deposits on the electrodes 8, 9 which would cause an impediment of voltage measurement. The frequencies employed are conventional.

The density of the fluid 1 flowing through is determined by way of a first electrode 9 and a second electrode 8 in that electric lines 22 and a voltage generator means 12 apply voltage to the first electrode 9 between remote spots 9a and 9b of the first electrode 9. The voltage can be applied in particular, as illustrated in the present embodiment, between the first end 10 and a second end 11 of the first electrode 9. The first end 10 and the first spot 9a at the first electrode 9 are provided herein in the bottom region of the housing while the second spot 9b and the second end 11 are positioned in the upper region of the housing.

The resistance of the electrode 9 is selected such that it is considerably smaller than that of the fluid to be measured at maximum fill height. In this way the influence of the fluid resistance on the total resistance can be neglected in a first approximation. However, said influence may be included in the calculation.

The applied potential depends on the individual case. In this embodiment the peak value of the alternating voltage is 60 mV while the impedance of the electrode 9 is approximately 100 milliohms.

In the first electrode the potential linearly increases with the height. The applied potential is introduced into the fluid at each location wetted with fluid. By way of the low absolute height of the potentials adverse effects on the animals to be milked are avoided.

The second electrode 8 extends from a first spot 8a or from a first end in the bottom region of the housing up to a second spot 8b or a second end in the upper region of the housing, acquiring a potential related to the fill height of the fluid 1 and the composition of the fluid. The voltmeter means 13 serves to connect the spot 8a of the second electrode 8 with the spot 9a of the first electrode 9 or the lower end 10 of the first electrode 9. Where only a pure liquid phase is present, a corresponding potential is applied to the second electrode 8 corresponding to the level of the flowing fluid and measured with the voltmeter means 13. The foam portion 2 is included since the specific impedance of the foam is correspondingly higher than that of the liquid phase. The impedance portions of the liquid phase and the foam phase combined form a total impedance which is representative of the density.

FIG. 3 shows a cross-section through an inventive device 100 comprising a first electrode 9 configured as a round bar and a second electrode 8 likewise configured as a round bar. The two electrodes 8 and 9 extend into a recess 14 in which fluid will accumulate even with lowest mass flows so as to establish an electrical connection between the first electrode 9 and the second electrode 8 via the liquid phase. An electrical contact via the liquid phase is important at the beginning of milking and in particular near the end of milking when the milk flow is low or insignificant. Where no liquid phase is present and only foam remains, measuring errors might otherwise occur.

A hollow filled with liquid phase ensures that correct measuring results will be obtained even with mass flows comprising a virtually pure foam phase.

Basic, simple embodiments also allow a small resistance to be connected in parallel instead of a hollow to simulate a "hollow". Satisfactory results may be obtained also in this way although with small flows of virtually purely foam the fluid conductance may influence the measurement results.

This measure allows measuring the potential even with the smallest mass flows. The recess 14 comprises a drain 15 through which fluid 1 can continuously drain off such that the fluid 1 in the recess 14 is continuously exchanged.

Any temporary variations of the conductivity of the fluid 1 are thus also sensed in the recess 14 so as not to cause inaccuracies in measuring. A minimum level of liquid forms by way of the recess 14 such that in potentiometric measuring not the fill height of the foam but the average density of the fluid 1 is determined.

Figure 6:
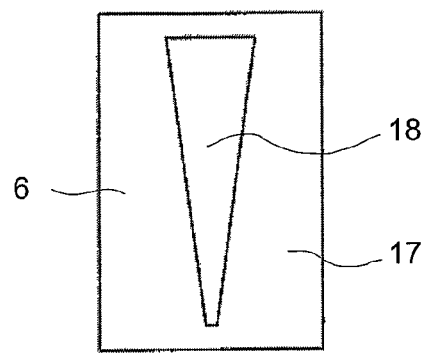
FIG. 6a flow resistance for small mass flows configured as a diaphragm.

FIGS. 5 and 6 show different embodiments of the flow resistance 6 as a diaphragm 17 having different conically tapering or trapezoidal opening cross-sections 18. The opening cross-sections 18 may be adjusted to specific measurements which offers the advantage that even small mass flows permit reliably measuring changes of the liquid level.

A specific embodiment of the device provides for a diaphragm 17 as illustrated e.g. in FIG. 5. The two electrodes 8, 9 may form the boundaries of the diaphragms 17 in that one edge 53 forms the first electrode 9 and the second edge 54, the second electrode 8. This configuration was originally considered disadvantageous since it had been expected that the potential introduced into the first electrode 9 would be irregular and the potential sensed with the second electrode 8 would also be irregular since the distance of the electrodes greatly varies above the height. Surprisingly it has been found though that this configuration results in high quality measuring results although the two electrodes are not positioned parallel relative to one another. The V-shape or the trapezoidal shape of the electrodes does not impair measuring. To the contrary, this configuration permits to obtain especially reliable measurements. The reason is among other things that the entire flowing fluid flows through the diaphragm and the density is determined between the two electrodes.

Figure 7:
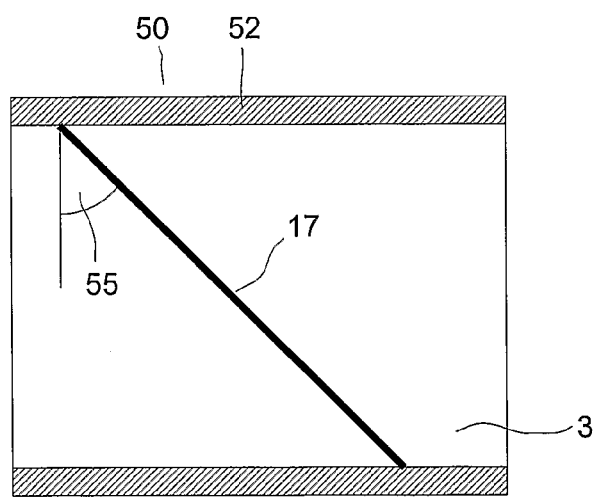
FIG. 7a longitudinal section of another embodiment of a device according to the invention.

FIG. 7 is a side view of a modified embodiment of the flow resistance. In this configuration the flow resistance is positioned at an incline to the vertical. While the angle to the vertical is approximately 45° herein, it may be between 0° and 60° or larger.

In this embodiment the edges of the diaphragm 17 may again be formed by one or both of the electrodes. Again the diaphragm 17 is trapezoidal in cross-section 18 as illustrated in the FIGS. 5 and 6. The diaphragm is inclined in the direction of flow. In this way, foreign particles in the flowing fluid which might otherwise settle in a bottom region of the diaphragm are flushed upwardly until the cross-section of the diaphragm is sufficient to entrain and flush off the foreign particles. Occlusion of the diaphragm will thus not occur as a rule.

Figure 8:
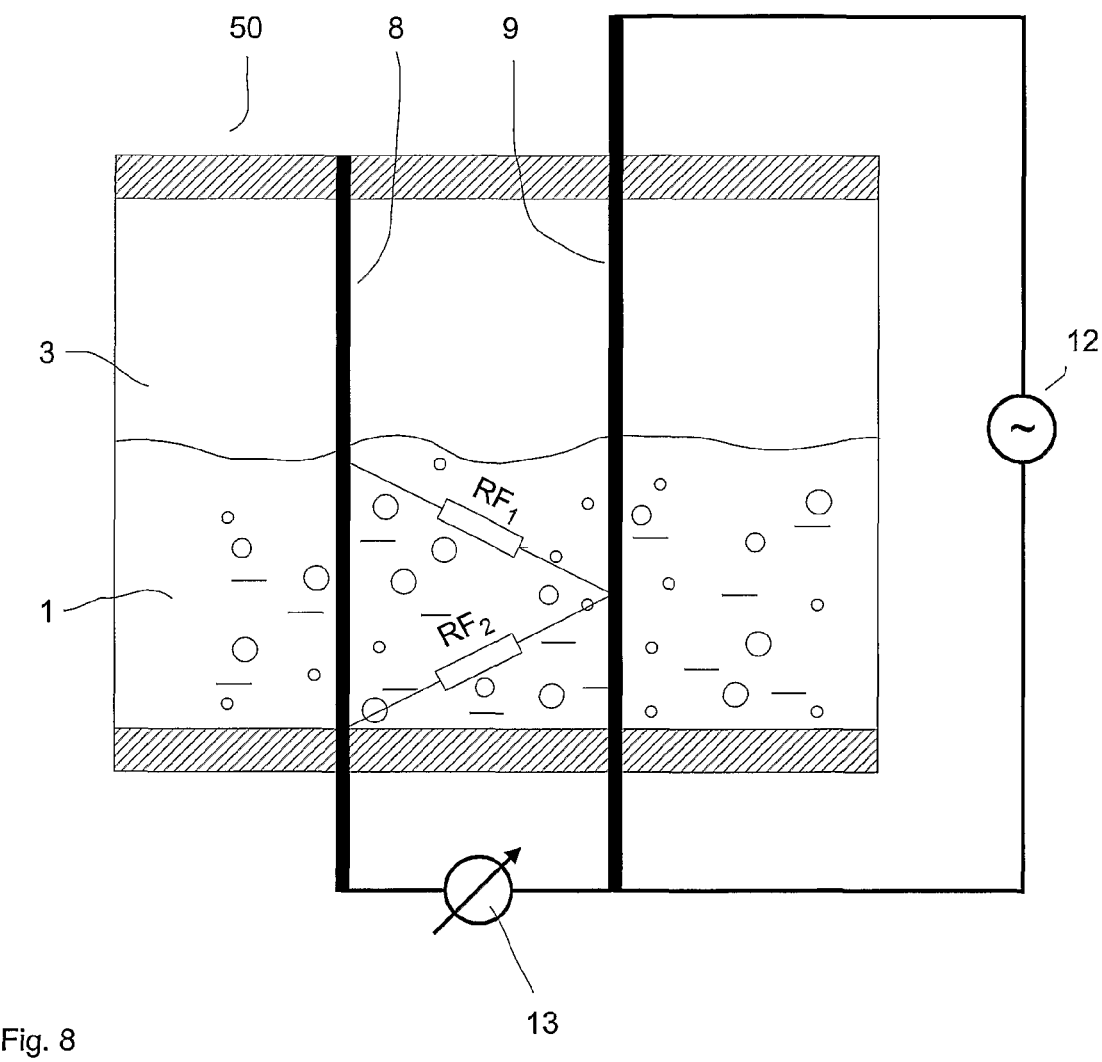
FIG. 8 an electrical equivalent circuit for a device according to the invention.

In FIG. 8 an equivalent diagram of the measuring principle is drawn in. The first electrode 9 consists of a low-resistance high-grade steel bar immersed into the conductive liquid-gas mixture. The voltage generator means 12 drives a high frequency current through the first electrode 9 via the supply lines 22. A voltage is measured by the voltmeter means 13 between the first electrode 9 and the second electrode 8.

The center equivalent resistances RF1 and RF2 of the liquid-gas mixture lie parallel to the immersed portion of the first electrode 9. The collected voltage is thus proportional to the density curve at the first electrode 9. Controlled current feed serves to minimize the direct effect of the center equivalent resistances RF1 and RF2 to the measuring result.

The invention claimed is:

1. A device for measuring the mass flow of a foaming fluid, in particular of milk during milking, comprising:
    a housing having at least one inlet oriented tangentially to an interior of the housing and at least one outlet, and the housing defines a first housing section having a first housing section axis and a second housing section having a second housing section axis that is disposed at an angle between about 10° and about 90° to the first housing section axis; and
    at least one measuring device having at least one sensor for determining the mass flow of a foaming liquid through the housing.

2. The device according to claim 1, wherein the housing is structured to generate a helical stream of foaming fluid.

3. The device according to claim 1, wherein the housing interior is substantially rounded adjacent to the inlet.

4. The device according to claim 1, wherein the housing interior is horizontally inclined in a region adjacent to the inlet.

5. The device according to claim 4, wherein the housing comprises at least two sections.

6. The device according to claim 4, wherein the housing comprises at least two sections positioned at an angle relative to one another.

7. The device according to claim 1, wherein the housing interior adjacent to the inlet is disposed at an angle between about 10° and about 60° from horizontal.

8. A device for measuring a mass flow of a foaming fluid, in particular of milk during milking, comprising:
    a housing having at least one inlet and at least one outlet, and at least one measuring device having at least one sensor for determining the mass flow of the foaming fluid, wherein the housing is structured to mix a foam portion with a liquid portion of the foaming fluid and the inlet is directed substantially tangentially into a housing interior, and an axis of a housing section upstream from the sensor is vertically inclined at least 30° and the interior housing section upstream from the sensor is structured to be at least substantially rotationally symmetric; and wherein a center section of the housing between the inlet and the outlet is positioned at an angle to the horizontal such that self-discharging occurs.

9. The device according to claim 1, wherein at least one housing section is substantially round in cross-section.

10. The device according to claim 1, wherein the inlet leads into the housing at an incline relative to horizontal.

11. The device according to claim 1, wherein the measuring device sensor is selected from a group consisting essentially of: an optical sensor, an electrical sensor, an acoustic sensor, and a magnetic sensor.

12. The device according to claim 1, wherein at least one measuring device has a first electrode and a second electrode, and an analyzer.

13. The device according to claim 1, wherein the measuring device includes: a first electrode and a second electrode positioned in a a measuring section.

14. The device according to claim 1, wherein the measuring device includes a first electrode and an electrical magnitude can be applied to the first electrode.

15. The device according to claim 1, and further comprising:
at least one flow restrictor disposed in the housing.

16. The device according to claim 1, and further comprising:
at least one diaphragm flow restrictor disposed in the housing.

17. The device according to claim 1, and further comprising:
at least one flow restrictor disposed in the housing and having a cross-section that is variable in height.

18. The device according to claim 1, and further comprising:
a flow restrictor disposed in the housing and having a variable height and a cross-section that increases with the height of the diaphragm.

19. The device according to claim 1, and further comprising:
a flow restrictor disposed in the housing to provide a clear distance in the narrowest region of the flow restriction that is larger than 2 mm.

20. A device for measuring a mass flow of a foaming fluid, in particular of milk during milking, comprising:
a housing having at least one inlet and at least one outlet, and at least one measuring device having at least one sensor for determining the mass flow of the foaming fluid,
wherein the housing is structured to mix a foam portion with a liquid portion of the foaming fluid, and the inlet is directed substantially tangentially into a housing interior and, an axis of a housing section upstream from the sensor is vertically inclined at least 30° and the interior housing section upstream from the sensor is structured to be substantially rotationally symmetric; and further comprising: at least one diaphragm flow restrictor disposed in the housing positioned at an incline to the direction of flow.

21. The device according to claim 20, wherein the diaphragm is positioned upwardly inclined in the direction of flow.

22. A device for measuring a mass flow of a foaming fluid, in particular of milk during milking, comprising:
a housing having at least one inlet and at least one outlet, and at least one measuring device having at least one sensor for determining the mass flow of the foaming fluid,
wherein the housing is structured to mix a foam portion with a liquid portion of the foaming fluid and, the inlet is directed substantially tangentially into a housing and an axis of a housing section upstream from the sensor is vertically inclined at least 30° and structured to be substantially rotationally symmetric, and the housing further includes a flow restrictor that has a substantially trapezoidal shape.

23. The device according to claim 1, and further comprising:
a flow restrictor having an upstream end that has an inlet substantially trapezoidal in shape.

24. The device according to claim 1, wherein a cross-section of the second housing section tapers to decrease in a direction of foaming fluid flow.

25. The device according to claim 1, and further comprising: a bypass between the inlet and the outlet to stabilize a pressure above the measuring section.

26. The device according to claim 1, and the measuring device sensor comprises: a first electrode; a second electrode; and a third electrode.

27. The device according to claim 26, wherein the third electrode extends downwardly into the second housing section.

28. The device according to claim 1, and further comprising: at least one inclination sensor for determining at least one inclination angle for at least a portion of the housing.

29. The device according to claim 1, wherein at least one correction parameter is provided in a memory device to take into account at least one inclination angle for at least a portion of the housing.

30. A device for measuring a mass flow of a foaming fluid, in particular of milk during milking, comprising:
a housing having at least one inlet and at least one outlet, and at least one measuring device having at least one sensor for determining the mass flow of the foaming fluid, wherein the housing is structured to mix a foam portion with a liquid portion of the foaming fluid and the inlet is directed substantially tangentially into a housing interior, an axis of a housing section upstream from the sensor is vertically inclined at least 30° from horizontal and is substantially rotationally symmetric; and wherein a partition wall is provided between a first housing section and a second housing section to reduce a cross-sectional area between the first housing section and the second housing section.

31. The device according to claim 30, wherein the partition wall closes off at least 50% of the cross-sectional area.

32. The device according to claim 30, wherein the partition wall reduces an upper portion of the cross-sectional area.

33. A device for measuring the mass flow of a foaming fluid, in particular of milk during milking, comprising:
a housing having an inlet oriented tangentially to an interior of the housing and an outlet, and the housing defines a measuring section disposed at an angle from horizontal from about 2° to about 45°; and
at least one measuring device having at least one sensor for determining the mass flow of a foaming liquid through the housing.

* * * * *